US011650710B2

(12) United States Patent
Plasmeier (10) Patent No.: US 11,650,710 B2
(45) Date of Patent: *May 16, 2023

(54) METHOD TO AUTOMATICALLY UPDATE A HOMESCREEN

(71) Applicant: VERIZON PATENT AND LICENSING INC., Basking Ridge, NJ (US)

(72) Inventor: Michael Plasmeier, Mountain View, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/729,792

(22) Filed: Dec. 30, 2019

(65) Prior Publication Data

US 2020/0133465 A1 Apr. 30, 2020

Related U.S. Application Data

(63) Continuation of application No. 14/921,983, filed on Oct. 23, 2015, now Pat. No. 10,521,070.

(51) Int. Cl.
*G06F 3/04817* (2022.01)
*G06F 3/0488* (2022.01)
(Continued)

(52) U.S. Cl.
CPC ........ *G06F 3/04817* (2013.01); *G06F 3/0482* (2013.01); *G06F 3/0488* (2013.01); *G06F 3/04842* (2013.01); *G06F 3/04845* (2013.01); *H04M 1/72448* (2021.01); *G06T 2207/30201* (2013.01); *H04M 1/72454* (2021.01)

(58) Field of Classification Search
CPC ............... G06F 3/04817; G06F 3/0482; G06F 3/04842; G06F 3/04845; G06F 3/0488; H04M 1/72563; H04M 1/72569; H04M 1/72572; H04M 1/72457; H04M 1/72448; H04M 1/72454; H04M 1/7245; G06T 2207/30201
See application file for complete search history.

(56) References Cited

U.S. PATENT DOCUMENTS

9,104,886 B1 * 8/2015 Dolbakian .............. G06F 21/62
9,569,069 B2 * 2/2017 Balasaygun .......... G06F 3/0481
(Continued)

*Primary Examiner* — Shen Shiau (57) ABSTRACT

In one embodiment, applications installed on a mobile device may be identified. Historical data pertaining to use of the applications installed on the mobile device may be obtained. A context of the mobile device may be ascertained. Locations in which a plurality of icons representing a plurality of items are to be presented within a homescreen of the mobile device may be determined based, at least in part, on the context of the mobile device and the historical data, where the plurality of items include the applications installed on the mobile device. The homescreen of the mobile device may be updated according to the determined locations, wherein updating the homescreen of the mobile device includes providing at least a portion of the plurality of icons for display within the homescreen of the mobile device such that the homescreen of the mobile device displays the plurality of icons representing the plurality of items at the determined locations.

20 Claims, 4 Drawing Sheets

(51) Int. Cl.
  *H04M 1/72448* (2021.01)
  *G06F 3/0482* (2013.01)
  *G06F 3/04842* (2022.01)
  *G06F 3/04845* (2022.01)
  *H04M 1/72454* (2021.01)

(56) References Cited

U.S. PATENT DOCUMENTS

| | | | | |
|---|---|---|---|---|
| 9,830,045 | B2* | 11/2017 | Klassen | G06F 3/04817 |
| 9,946,427 | B1* | 4/2018 | Murphy | G06F 9/451 |
| 10,209,861 | B2* | 2/2019 | Meyr | H04M 1/7243 |
| 10,261,672 | B1* | 4/2019 | Dolbakian | G06F 3/04817 |
| 10,338,938 | B2* | 7/2019 | Beaumont | G06F 3/0481 |
| 10,445,773 | B1* | 10/2019 | Larocca | G06Q 30/0633 |
| 10,521,070 | B2* | 12/2019 | Plasmeier | G06F 3/04842 |
| 2005/0120306 | A1* | 6/2005 | Klassen | G06F 3/04817 715/765 |
| 2008/0104018 | A1* | 5/2008 | Xia | G06F 9/451 |
| 2009/0061841 | A1* | 3/2009 | Chaudhri | H04M 1/72409 455/420 |
| 2009/0322650 | A1* | 12/2009 | Kakie | G06F 3/0481 345/1.3 |
| 2010/0223569 | A1* | 9/2010 | Vuong | H04M 1/72436 715/772 |
| 2011/0246916 | A1* | 10/2011 | Leskela | G06F 3/0488 345/173 |
| 2012/0030623 | A1* | 2/2012 | Hoellwarth | G06F 3/04817 715/811 |
| 2012/0095979 | A1* | 4/2012 | Aftab | H04L 51/36 707/706 |
| 2012/0101952 | A1* | 4/2012 | Raleigh | H04L 12/1417 709/223 |
| 2012/0179978 | A1* | 7/2012 | Klassen | G06F 3/0488 715/752 |
| 2012/0216127 | A1* | 8/2012 | Meyr | H04M 1/7243 715/752 |
| 2012/0278722 | A1* | 11/2012 | Raleigh | H04W 4/26 715/735 |
| 2013/0080890 | A1* | 3/2013 | Krishnamurthi | G06F 3/016 715/702 |
| 2013/0086481 | A1* | 4/2013 | Balasaygun | G06F 3/0484 715/745 |
| 2013/0111345 | A1* | 5/2013 | Newman | G06F 1/3203 715/764 |
| 2013/0138723 | A1* | 5/2013 | Ku | G06F 9/451 709/203 |
| 2013/0346922 | A1* | 12/2013 | Shiplacoff | G06F 3/0484 715/835 |
| 2014/0013271 | A1* | 1/2014 | Moore | G06F 3/04883 715/792 |
| 2014/0035835 | A1* | 2/2014 | Zhang | G06F 9/451 345/173 |
| 2014/0037107 | A1* | 2/2014 | Marino, Jr. | H03G 3/3005 381/107 |
| 2014/0040756 | A1* | 2/2014 | Bukurak | G06F 3/017 715/741 |
| 2014/0071036 | A1* | 3/2014 | Blue | G06F 1/1626 345/156 |
| 2014/0089857 | A1* | 3/2014 | Wang | G06F 9/4484 715/835 |
| 2014/0142953 | A1* | 5/2014 | Kim | G10L 15/22 704/275 |
| 2014/0181123 | A1* | 6/2014 | Tuffet Blaise | G06F 16/48 707/749 |
| 2014/0201655 | A1* | 7/2014 | Mahaffey | G06F 3/04817 715/765 |
| 2014/0201681 | A1* | 7/2014 | Mahaffey | H04M 1/72454 715/846 |
| 2014/0320507 | A1* | 10/2014 | Myung | G06F 3/0488 345/474 |
| 2015/0065170 | A1* | 3/2015 | Brisebois | H04W 4/023 455/456.3 |
| 2015/0193424 | A1* | 7/2015 | Lee | G06F 9/451 715/763 |
| 2015/0296072 | A1* | 10/2015 | Zhou | H04W 4/50 455/414.1 |
| 2015/0350147 | A1* | 12/2015 | Shepherd | G06F 3/04842 715/752 |
| 2015/0350414 | A1* | 12/2015 | Park | G06F 3/04817 455/566 |
| 2016/0062635 | A1* | 3/2016 | Feit | G06F 3/1454 715/765 |
| 2016/0063399 | A1* | 3/2016 | Agarwal | H04L 51/08 715/752 |
| 2016/0092071 | A1* | 3/2016 | Lawson | G06F 3/0482 345/156 |
| 2016/0284321 | A1* | 9/2016 | Cho | G09G 5/14 |
| 2017/0046024 | A1* | 2/2017 | Dascola | G06F 3/04845 |
| 2017/0075551 | A1* | 3/2017 | Robinson | G06F 3/04817 |
| 2017/0109011 | A1* | 4/2017 | Jiang | G06F 3/04883 |
| 2017/0115848 | A1* | 4/2017 | Plasmeier | G06F 3/04842 |
| 2017/0285878 | A1* | 10/2017 | VanBlon | G06F 3/04817 |
| 2017/0286913 | A1* | 10/2017 | Liu | H04W 4/12 |
| 2017/0353815 | A1* | 12/2017 | Jagannathan | H04M 1/72525 |
| 2018/0032997 | A1* | 2/2018 | Gordon | G06Q 30/0269 |
| 2018/0059884 | A1* | 3/2018 | Kim | G06F 3/0482 |
| 2019/0138186 | A1* | 5/2019 | Rolih | G06F 3/0482 |
| 2019/0369842 | A1* | 12/2019 | Dolbakian | G06F 3/04817 |

* cited by examiner

METHOD TO AUTOMATICALLY UPDATE A HOMESCREEN

RELATED APPLICATION

This application claims priority to and is a continuation of U.S. application Ser. No. 14/921,983, filed on Oct. 23, 2015, entitled "METHOD TO AUTOMATICALLY UPDATE A HOMESCREEN", which is incorporated by reference herein in its entirety.

BACKGROUND

The disclosed embodiments relate generally to computer-implemented methods and apparatus for updating a homescreen. More particularly, the disclosed embodiments relate to managing the launching, organization, and recommendation of applications via a homescreen.

Mobile applications are becoming ubiquitous due to the increasing popularity of mobile devices such as smartphones and tablets. Due to an increasing availability and usage of mobile applications, mobile devices often have a very large number of applications installed. Given the limited screen size of mobile devices and lack of a keyboard, it is often tedious for users to search for an application they want to use through a potentially very large collection of installed applications.

To find applications that are used often, a user may manually organize their applications on their mobile device. For example, a user may arrange applications within a homescreen displayed on a screen of their mobile device.

SUMMARY

In one embodiment, applications installed on a mobile device may be identified. Historical data pertaining to use of the applications installed on the mobile device may be obtained. In addition, a context of the mobile device may be ascertained. Locations in which a plurality of icons representing a plurality of items are to be presented within a homescreen of the mobile device may be determined based, at least in part, on the context of the mobile device and the historical data, where the plurality of items include the applications installed on the mobile device. The homescreen of the mobile device may be updated according to the determined locations, wherein updating the homescreen of the mobile device includes providing at least a portion of the plurality of icons for display within the homescreen of the mobile device such that the homescreen of the mobile device displays the plurality of icons representing the plurality of items at the determined locations.

In another embodiment, a device includes a processor, memory, and a display. The processor and memory are configured to perform one or more of the disclosed method operations. In another embodiment, a computer readable storage medium has computer program instructions stored thereon that are arranged to perform one or more of the disclosed method operations.

These and other features and advantages will be presented in more detail in the following specification and the accompanying figures which illustrate by way of example various embodiments.

DETAILED DESCRIPTION OF THE SPECIFIC EMBODIMENTS

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

One of the major issues associated with the large number of applications installed on many mobile devices is that of their visibility. More particularly, when a user wishes to use a particular application, it is not always available immediately and the search through the large number of installed applications might take a significant amount of time. As a result, users are looking for new methods (including $3^{rd}$ party homescreen applications) to select an application to run.

A homescreen application may act as an intelligent layer between an underlying mobile operating system of a mobile device and a user interface of the mobile device. In accordance with various embodiments, the homescreen application may manage the installed apps in a highly personalized manner rather than simply relying on manual (or trivial) categorization schemes.

The disclosed embodiments may be implemented, at least in part, by a homescreen application installed on a mobile device. In addition, various features may be implemented via remotely located server(s).

As will be described in further detail below, a personalized homescreen update system may update a homescreen of a mobile device based, at least in part, on a current context of the mobile device and historical data pertaining to use of applications installed on the mobile device. The historical data may include data collected via the mobile device. In addition, the historical data may include data collected via other mobile devices. For example, historical data that has been collected via other mobile devices may be useful in situations in which an insufficient amount of historical data has been collected by the mobile device. Such situations may include those in which an application has been recently installed on the mobile device, the mobile device has been recently acquired by the user, or a homescreen application implementing the personalized homescreen update system has recently been installed.

The historical data for a particular mobile device may indicate, for an installed application, a number of times that the application has been opened via the mobile device, an amount of time that the application has been opened via the mobile device, a frequency of use of the application via the mobile device, a recency of use of the application via the mobile device, whether the application has previously been opened via the mobile device, contexts in which the application has been opened via the mobile device, and/or any patterns that are identified with respect to the opening of the application. For example, a pattern may indicate a context and/or action (e.g., opening of another application) that frequently precedes the opening of the application.

The context of a mobile device may represent a state of the mobile device at a particular time. The context may pertain to information that is continuously sensed or gathered by the mobile device, as well as data or messages that are received by the mobile device. The context may include, but is not limited to, a time, a date, a time, a time of day (e.g., morning, evening, etc.), a location of the mobile device, a status of a battery of the mobile device, a status of a screen of the mobile device, a Bluetooth status, a status of a wireless network connection at the mobile device, a headphone status, a status of a charge cable, a status of an audio cable, a brightness detected at the mobile device, a volume detected at the mobile device, sounds or words detected at the mobile device, electronic mail messages that have been received via the mobile device, notifications that have been received at the mobile device via a short message service (SMS), and/or notifications that have been received by a user of the mobile device via a social network.

In some embodiments, the homescreen update system may further analyze historical data pertaining to applications that are not installed on the mobile device. Thus, the historical data may include data collected via other mobile devices. This enables the prediction system to recommend applications that are not already installed on the mobile device.

Figure 1:
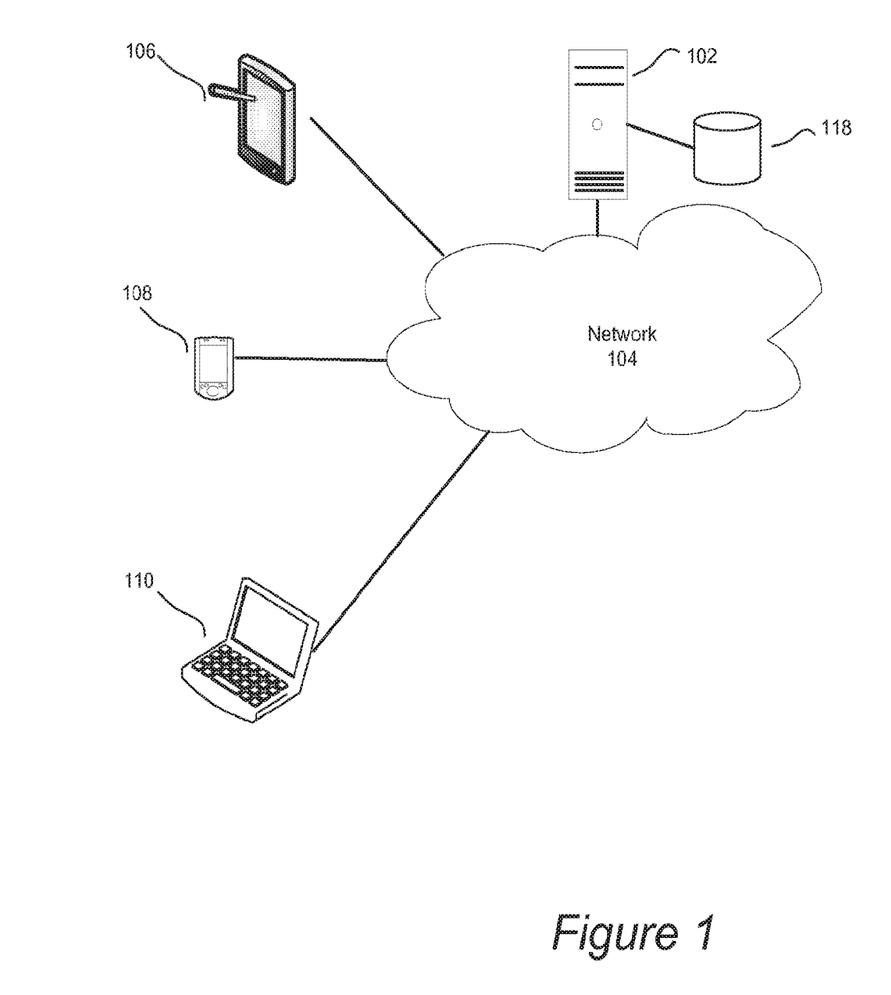
FIG. 1 is a diagram illustrating an example system in which various embodiments may be implemented.

FIG. 1 is a diagram illustrating an example system in which various embodiments may be implemented. As shown in FIG. 1, the system may include one or more servers 102, which may be associated with a web site. The server(s) 102 may enable the web site to provide a variety of services to its users. More particularly, the server(s) 102 may include a web server, search server, and/or content server.

A plurality of clients 106, 108, 110 may access a web service on a web server via a network 104. The network 104 may take any suitable form, such as a wide area network or Internet and/or one or more local area networks (LAN's). The network 104 may include any suitable number and type of devices, e.g., routers and switches, for forwarding search or web object requests from each client to a search or web application and search or web results back to the requesting clients.

The disclosed embodiments may also be practiced in a wide variety of network environments (represented by network 104) including, for example, TCP/IP-based networks, telecommunications networks, wireless networks, etc. In addition, computer program instructions with which embodiments of the invention may be implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

In accordance with various embodiments, the clients 106, 108, 110 may install applications from server(s) via the network 104. In addition, the clients 106, 108, 110 may open or otherwise access applications installed on the clients 106, 108, 110. For example, the clients 106, 108, 110 may include mobile devices. An example client device will be described in further detail below.

A personalized homescreen update system may be implemented via any of the clients 106, 108, 110 and/or remotely located server(s) 102. More particularly, various features may be implemented by a homescreen application that has been installed on the clients 106, 108, 110. For example, a user may download the homescreen application onto a mobile device from an application store via the server(s) 102. The disclosed embodiments may be implemented via software and/or hardware.

Personalized application prediction may be performed based, at least in part, upon a current context of a particular mobile device and historical data pertaining to use of applications installed on the mobile device. More particularly, personalized application prediction for a given mobile node may be performed using a prediction model associated with the mobile node. In addition, personalized application prediction may be performed based, at least in part, upon information associated with a set of other mobile devices that do not include the mobile device. For example, information associated with other mobile devices may be used to perform personalized application prediction where the historical data collected by the mobile device for installed applications is unavailable or otherwise limited. Such information may include historical data and/or information derived via a prediction model associated with at least one of the other mobile devices.

Where the historical data collected by the mobile device (e.g., via the homescreen application) is deemed insufficient to make accurate application predictions, a set of other mobile devices may be identified based, at least in part, on the set of applications installed on the mobile device and/or characteristics of a user of the mobile device. For example, a set of mobile devices that have or have had the same applications installed thereon may be identified. As another example, a set of other mobile devices for which users share characteristics with the user of the mobile device may be identified based, at least in part, on the corresponding user profiles.

When a user interacts with applications installed on the mobile device, historical data pertaining to use of the applications may be updated at the mobile device and/or remote server(s). More particularly, the historical data may be updated each time the user uses (e.g., opens) an installed application. For example, the historical data may indicate the date that the application was opened, the time that the application was opened, and/or an amount of time that the application was open. The historical data may further indicate the number of times that the application has been used, the frequency that the application is used (e.g., number of times per hour or day), the recency that the application has been used, and/or the contexts in which the application has been used. The historical data may also indicate the date and/or time that the application was installed on the mobile device. The historical data may be stored in association with the mobile device in a user profile or, alternatively, a device profile.

A variety of mechanisms may be implemented to support the generation of user profiles including, but not limited to, collecting or mining navigation history, stored documents, tags, or annotations, to provide a few examples. Profiles of users of a search engine, for example, may give a search engine provider a mechanism to retrieve annotations, tags, stored pages, navigation history, or the like, which may be useful for making relevance determinations of search results, such as with respect to a particular user.

In accordance with various embodiments, the server(s) 102 may have access to one or more user logs 118 (e.g., user databases) into which user information is retained for each of a plurality of users. This user information or a portion thereof may be referred to as a user profile. More particularly, the user profile may include public information that is available in a public profile and/or private information. The user logs 118 may be retained in one or more memories that are coupled to the server 102.

The user information retained in the user logs 118 may indicate a plurality of features for each user. More particularly, the features may include personal information such as demographic information (e.g., age and/or gender) and/or geographic information (e.g., residence address, work address, zip code, and/or area code). In addition, each time a user performs online activities such as clicking on a web page (or region thereof) or an advertisement, or purchasing goods or services, information regarding such activity or activities may be retained as user data in the user logs 118. For instance, the user data that is retained in the user logs 118 may indicate the identity of web sites visited, identity of ads that have been selected (e.g., clicked on) and/or a timestamp. In addition, the features may indicate a purchase history with respect to one or more products, one or more types of products, one or more services, and/or one or more types of services. Additional features may indicate one or more interests of the user.

The user logs 118 may further include query logs into which search information is retained. Each time a user performs a search on one or more search terms, information regarding such search may be retained in the query logs. For instance, the user's search request may contain any number of parameters, such as user or browser identity and the search terms, which may be retained in the query logs. Additional information related to the search, such as a timestamp, may also be retained in the query logs along with the search request parameters. When results are presented to the user based on the entered search terms, parameters from such search results may also be retained in the query logs. For example, an identity of the specific search results (e.g., Uniform Resource Locators (URLs)), such as the web sites, the order in which the search results are presented, whether each search result is a sponsored or algorithmic search result, the owner (e.g., web site) of each search result, and/or whether each search result is selected (i.e., clicked on) by the user (if any), may be retained in the query logs.

In accordance with various embodiments, a user profile may be associated with one or more client devices, which may include one or more mobile devices. Thus, where the user has multiple devices, the user profile may include identifiers associated with the devices and/or information gathered via the different devices. Conversely, each client device may be associated with a set of one or more users, enabling user profile(s) associated with the client device to be identified.

Each mobile device may also have an associated device profile, which may be stored separately or in combination with the user profile. The device profile may include a current context, as will be described in further detail below. The device profile may also identify all applications installed on the mobile device, as well as a current homescreen configuration (user-specified and/or automatically configured). More particularly, the device profile may specify locations within the homescreen at which icons corresponding to various applications (or other items) have previously been arranged by the user. In addition, the device profile may further indicate the context present during this manual arrangement.

The device profile or user profile may further include historical data pertaining to the use of installed applications or types (i.e., categories) of applications. More particularly, the historical data may indicate, for each installed application, a frequency of use of the installed application and/or a recency of use of the installed application. The historical data may also indicate whether a location of an icon (e.g., representing an application) within the homescreen was previously selected by the user of the mobile device by explicitly moving or arranging the icon. In addition, the historical data may identify applications that have previously been removed by the user from the homescreen. In some embodiments, the historical data may indicate the last application opened via the mobile device. The historical data may be used to train a prediction model associated with the mobile device. In some embodiments, the user or device profile may further include parameter values associated with the prediction model.

A device profile of a mobile node may be stored locally on a mobile device and/or remotely at a remotely located server. In addition, a device profile or information from a device profile may be transmitted or otherwise shared between a mobile device and the remotely located server. Thus, the server may have access to a plurality of device profiles associated with a plurality of mobile devices. Therefore, the server may identify a class of mobile devices sharing a set of characteristics with a given mobile device based upon their corresponding device profiles and/or user profiles.

Given a list of applications {au1; au2; ... ; aun} installed on a mobile device of a user u, context C of the mobile device, and the historical data pertaining to use of the installed applications, the homescreen update system may update the homescreen of the mobile device. Various mechanisms for updating the homescreen of the mobile device may be used separately or in combination with one another. Some of these mechanisms will be described in further detail below.

Figure 2:
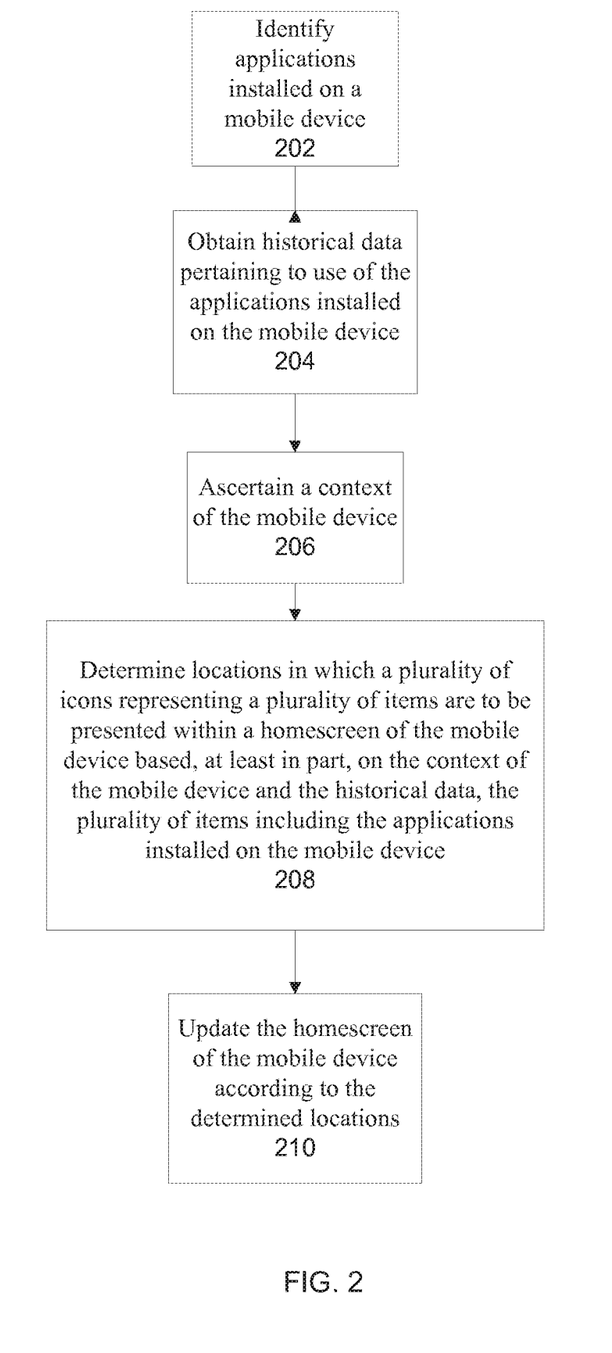
FIG. 2 is a process flow diagram illustrating an example method of updating a homescreen in accordance with various embodiments.

FIG. 2 is a process flow diagram illustrating an example method of updating a homescreen of a mobile device in accordance with various embodiments. Applications installed on a mobile device may be identified at 202. More particularly, a list of applications installed on the mobile device may be obtained from a user profile or device profile associated with the mobile node.

Historical data pertaining to use of the applications may be maintained at the server(s) and/or mobile device. The historical data that will be processed to update the homescreen may be ascertained (e.g., retrieved) at 204. More particularly, the historical data may indicate a frequency of use of the applications via the mobile device, recency of use of the applications via the mobile device, and/or contexts in which the applications have been used via the mobile device. Example contexts will be described in further detail below.

Where the historical data pertaining to use of the installed application(s) via the mobile device is insufficient to make accurate predictions, the historical data collected via a set of other mobile devices may be ascertained. For example, the historical data may indicate contexts in which the applications have been used (e.g., opened) via the other mobile devices and/or a frequency of use of the applications via the other mobile devices. Various mechanisms for identifying a set of other mobile devices and applying the historical data associated with other mobile devices will be described in further detail below.

A context of the mobile device may be ascertained at 206. In some embodiments, various aspects of the context of the mobile device may be continuously monitored and updated. Alternatively, the context may be updated periodically (e.g., every second) or in response to a change in the context.

The context may represent the current state of the mobile device at the time that the context is ascertained. More particularly, the context of the mobile device may include information gathered via software of the mobile device and/or hardware (e.g., sensors) of the mobile device. For example, the context may include a current time, a current location of the mobile device, a current status of a battery of the mobile device, a current status of a screen of the mobile device, a current Bluetooth status, a current status of a wireless network connection at the mobile device, a current headphone status, a current status of a charge cable, a current status of an audio cable, a current brightness detected at the mobile device, a volume detected at the mobile device, and/or sounds or words detected at the mobile device.

The context may also include a status or content of messages received via the mobile device or via an account (e.g., social network account or email account) of a user of the mobile device. For example, the context may include content of electronic messages that have been received via the mobile device or a user account, and/or notifications of short message service (SMS) messages that have been received at the mobile device. In addition, the context may include information pertaining to contact(s) of the user, such as frequency with which the user communicates with the contact and/or recency with which the user has communicated with the contact(s). Communication may be performed via the mobile device or a user account. For example, communication with a contact may be achieved via telephone, Facetime, electronic mail, SMS, or other mechanism.

The context may also include further information that is pertinent to the mobile device or user. For example, the context may include an event occurring at the time that the context is ascertained. An event may be identified, for example, from a calendar of the user, electronic communications of the user, documents published on the Internet, or other sources.

In some embodiments, the detection of a change in the context of the mobile device may trigger the updating of the homescreen of the mobile device. More particularly, locations in which icons representing items including installed applications may be determined and the homescreen may be updated according to the determined locations in response to various contextual triggers. For example, where the user has plugged in headphones, the system may update the homescreen to prominently display an icon corresponding to a music and/or video application.

Locations in which a plurality of icons representing a plurality of items are to be presented within a homescreen of the mobile device may be determined at 208 based, at least in part, on the context of the mobile device and the historical data. The items may include the applications installed on the mobile device. In some embodiments, the locations in which icons representing items to be presented within the homescreen of the mobile device may be further determined based, at least in part, on a user profile of a user of the mobile device.

The system may select locations in which icons corresponding to installed applications are to be presented based, at least in part on the context of the mobile device and the historical data pertaining to use of the installed applications. For example, where the user is at home and the historical data indicates that the user often accesses a particular gaming application while at home, the homescreen may select a more prominent location within the homescreen in which to display the particular gaming application. Therefore, where the user has used an application in a given context, the system may present an icon corresponding to the application in a more prominent location when the user is in the same context.

In some embodiments, an application prediction system may calculate, for each installed application, the probability that the user will use the installed application under the current context C based, at least in part, on the historical data pertaining to use of the installed applications. The homescreen may be updated according to the probabilities associated with the installed applications. For example, the installed applications may be ranked based, at least in part, on the context of the mobile device and the history of use of the applications. The applications having the largest probability of being used (or having a higher ranking) under the user's context may be featured more prominently on the homescreen of the mobile device.

The probability of use of the installed applications may be determined by applying a computer-generated model associated with the mobile device to the current context. However, contextual information may not be available (or alternatively, may be limited) for some or all of the applications installed on the mobile device. For example, contextual information associated with newly installed applications may be unavailable or limited. As a result, the contextual data collected for the mobile device may be insufficient to train a model. Thus, in some instances, the model may be trained using historical data pertaining to use of the installed applications by other mobile devices, as will be described in further detail below.

In addition, one or more additional items for which icons are to be presented within the homescreen of the mobile device may be selected based, at least in part, on the context of the mobile device such that the plurality of items include the additional item(s). Moreover, the items may be further selected based, at least in part, on a user profile of the user. The items may include, but are not limited to, a contact of a user of the mobile device, a notification of a message received via the mobile device, content of a message received via the mobile device, a content item such as an advertisement or news article, and/or an application that is not installed on the mobile device. For example, the items may include a contact with whom the user frequently communicates. In this manner, a notification or message may be translated into an icon. As another example, when the mobile device is at or near a location such as the airport, the homescreen application of the mobile device may recommend an application pertaining to the location (or frequently used by other mobile devices at the location) by presenting an icon representing the application within the homescreen.

In some embodiments, additional items for which icons are to be presented within the homescreen of the mobile device may be identified based, at least in part, on historical data associated with other mobile devices. For example, an application that is used at a particular location by other mobile devices may be recommended when the mobile device is at or near the location. More particularly, the application may be recommended based upon a correlation between the application and the location that has been inferred from the historical data. Such a correlation may be inferred based upon frequent use of the application at the location by other mobile devices. Similarly, such a correlation may be inferred based upon disproportionate use of the application at that location by other mobile devices in comparison to use of other applications by the mobile devices at that location. Alternatively, such a correlation may be inferred based upon the disproportionate use of the application by other mobile devices at that location in comparison to the use of the application by the mobile devices at other locations.

In accordance with various embodiments, the homescreen may display icons according to a grid. More particularly, the grid may be defined by a fixed number of rows and/or columns, where each row or column may include a maximum number of icons. Each icon may be displayed with the same dimensions. For example, the grid may be a 5×4 grid that includes five rows and four columns, enabling a maximum of 20 icons to be displayed within the grid. Therefore, the system may identify the items that are most likely to be used by the user under the current context, where the number of items that are identified is limited by the number of icons that may be displayed within the grid.

The system may select locations in which icons corresponding to at least a portion of the plurality of items are to be presented within the homescreen of the mobile device based, at least in part, on the context of the mobile device. For example, the system may select locations in which icons corresponding to new applications that are not installed on the mobile device are to be presented within the homescreen of the mobile device. These items (e.g., recommended applications) may ranked based, at least in part, on the context of the mobile device. In addition, the items may be ranked based, at least in part, on the user profile. The locations of icons corresponding to the items (e.g., recommended applications) may be selected based, at least in part, on a ranking of the items.

In addition, the locations of icons within the homescreen may be determined such that various types of items or types of applications remain in the same locations (e.g., row, column, or other segment(s) of the homescreen) over time. For example, icons corresponding to games may be presented in the bottom row of the homescreen, while icons corresponding to communication applications such as electronic mail and text messaging applications may be presented in the top row of the homescreen. As another example, icons corresponding to recommended applications (e.g., applications that are not installed on the mobile device) may be presented in a particular row of the homescreen. As yet another example, location-based applications (e.g., an airport application or an amusement park application) may be presented in a particular segment of the homescreen. Therefore, specific types of applications or other types of items may be maintained in specific rows, columns, or other segments of the homescreen over time.

In some embodiments, the homescreen application may introduce various features individually or gradually over time to "train" the user to recognize that specific type(s) of applications or items are located in particular rows, columns, or other segments of the homescreen. For example, the homescreen application may initially present icons corresponding to games in an upper row of the homescreen on one day, and on the next day also present icons corresponding to contacts with whom the user frequently communicates in a lower row of the homescreen.

In some embodiments, an icon may represent a recommended application. More particularly, a display attribute such as color, saturation, or brightness of the icon may signify to the user that the application represented by the icon is recommended by the homescreen application and not yet installed on the mobile device. For example, the icon may be displayed such that is dimmer or lighter in color than icons corresponding to installed applications. In other embodiments, a mini download icon may be displayed above the icon representing the application. The user may click on the icon representing the application or a corresponding download icon to download the recommended application. In some embodiments, where the user interacts with the icon (e.g., by holding down a mouse button while clicking on the icon), a message indicating the reason that the application is recommended may be presented via a screen of the mobile device.

In some embodiments, the system may automatically download a recommended application where the recommended application is not already installed on the mobile device. For example, the homescreen application may "fade in" the icon corresponding to the recommended application by increasing the saturation or brightness of the icon or, alternatively, by modifying the color of the icon. The user may later delete the application by clicking on the corresponding icon.

Similarly, icons may be "faded out" over time where the corresponding applications are not used recently or frequently by the user of the mobile device. More particularly, a display attribute of at least one of the icons may be modified based, at least in part, on a frequency and/or recency of access of corresponding items (e.g., applications). For example, the color, saturation, and/or brightness of an icon may be reduced over a particular period of time (e.g., days or weeks). At the end of the period of time during which an icon is "faded out," the icon may be automatically removed from the homescreen and the corresponding item (e.g., application) may be automatically deleted from the mobile device by the homescreen application. Therefore, the homescreen application may choose not to assign a location within the homescreen to an installed application where the installed application has not been used recently or frequently by a user of the mobile device.

In accordance with various embodiments, a display attribute such as color, saturation, or brightness of an icon may signify a trial or suggestion by the homescreen of an icon's position, where the icon corresponds to an installed application. For example, the homescreen application may fade the saturation or brightness of the icon. Therefore, the user may easily recognize the icon as one for which the location of the icon was not previously selected by the user.

In some embodiments, user-selected locations of the installed applications or a portion thereof may be preserved. More particularly, where the user has explicitly moved an icon for an application to a particular location on the homescreen, the system may choose not to modify the location of the user-arranged icon on the homescreen. Alternatively, the homescreen application may apply a "higher bar" (e.g., via weights or another mechanism) when choosing to modify a display attribute of a user-arranged icon (e.g. via "fade out") or choosing to modify the location of the user-arranged icon (e.g., by moving or deleting the icon).

Users may prefer that the homescreen does not block portions of their wallpaper. For example, where the wallpaper is a photo of the user's child, they may prefer that the child's face is not blocked by icons of the homescreen. Thus, in some embodiments, the system may perform face detection in the wallpaper of the homescreen. The locations may be determined based, at least in part, a result of performing face detection such that face(s) in the homescreen are not blocked by icons displayed on the homescreen.

In some embodiments, an application installed on the mobile phone may control the appearance or content of an icon representing or associated with the application, the context in which an icon is displayed, and/or the content of one or more tile(s) (e.g., cards) to be displayed after a user selects (e.g., clicks on) the icon. More particularly, an installed application may register with the homescreen application. In addition, the installed application may transmit a request pertaining to display of an icon or underlying tile(s) to the homescreen application via an application programming interface (API). For example, a phone application may wish to notify the user of the mobile device that the user has 15 minutes left in their phone plan. As another example, an airport application may wish to display a corresponding icon when the user is within one mile of the airport. As yet another example, an airport application may wish to change the color of the airport application icon as the user approaches the airport. In this manner, an installed application may propose an icon or tile(s).

After receiving a request from a third-party application installed on the mobile device, the homescreen application may consider the request. Specifically, the homescreen application may choose to ignore the request or may choose to defer to the request. For example, the homescreen application may determine whether the request is relevant given the context of the mobile device and/or history of use of applications. Therefore, an icon corresponding to the installed application or associated tile(s) may be determined and/or presented according to a request received from a third-party application based, at least in part, on the context of the mobile device.

In accordance with various embodiments, the homescreen application may generate or modify an icon or tile(s) associated therewith based, at least in part, on content of an electronic mail message. For example, where an electronic mail message includes a confirmation of a purchase of a flight, an icon representing the flight may be generated and presented via the homescreen. The appearance of the icon may be modified as the date of the flight approaches. More particularly, the color of the icon may represent the status of the flight. For example, the color of the icon may change to indicate whether the flight is on time, delayed, or cancelled.

The homescreen of the mobile device may be updated at 210 according to the determined locations, wherein updating the homescreen of the mobile device includes providing at least a portion of the plurality of icons for display within the homescreen of the mobile device such that the homescreen of the mobile device displays the plurality of icons representing the plurality of items at the determined locations. Each icon may represent a corresponding one of the plurality of items. More particularly, where the locations of icon(s) have changed and/or icon(s) are newly added to the homescreen, the homescreen or portion thereof may be updated for presentation via a display of the mobile device. The homescreen may be updated automatically or in response to a user request submitted via the mobile device.

As described above, an icon may represent an installed application or other item. In some instances, an icon may represent a tile or set of tiles, which may also be referred to as cards. For example, an icon may represent a folder in which multiple tiles are maintained. Thus, an icon may represent a single tile or a collection of tiles. A collection of tiles may also be referred to as a "stack" of cards. To view a card or "stack" of cards, the user may click on the icon, which may produce a larger, "full-size" version of a card (e.g., the card at the top of the stack).

To interact with an item, view an item, or open an application corresponding to an icon, the user may click on the icon. For example, to communicate with a contact represented by an icon, the user may click or tap on the icon. As another example, the user may click or tap on an icon representing a flight to view details regarding the status of the flight.

A record of the use (e.g., opening) of applications and/or types of applications may be maintained on the mobile device in association with corresponding contexts. For example, the record may be maintained by a homescreen application installed on the mobile device and/or may be maintained at a remotely located server. Thus, a remotely located server may maintain, for a plurality of mobile devices, a record of the use of applications actions and contexts of the use of the applications. As described herein, the context of the use of an application (or type of application) may include a context surrounding (e.g., prior to and/or subsequent to) the use of the application.

In accordance with various embodiments, a timestamp may be recorded in association with the use (e.g., opening) of applications, types of applications, or other items. In addition, a timestamp may be recorded in association with various additional contextual features. As a result, it is possible to identify a context accompanying or surrounding the use of an application (or type of application). In some instances, the context surrounding the opening of an application includes a sequence of actions that are conducted before and/or after the user opens the application (e.g., within a particular time period of the action).

Context

The context may be updated continuously or in response to the detection of a change in context. In some instances, a change in context may be initiated by a user. More particularly, a change in context may be initiated by the user directly (e.g., by speaking into a microphone of the mobile device), as well as indirectly (e.g., by driving or walking with the mobile device).

Various contextual features may include signal features such as those that can be obtained from sensors of a mobile device. In addition, the contextual features may include distributed features, which may indicate sequential patterns with respect to application usage. More particularly, a sequential pattern may indicate a context surrounding (e.g., prior to and/or after) opening a particular application.

Signal Features

Various signal features may be obtained automatically by the mobile device without initiation by a user. For example, the signal features may define the user's spatiotemporal context.

In accordance with various embodiments, the location of the mobile device may include a latitude and/or longitude determined via a Global Positioning System (GPS). The location may be further determined based, at least in part, on GPS accuracy and/or speed with which the mobile device is traveling. The latitude feature and longitude feature may specify the latitude and longitude of the mobile device ascertained via the GPS, while the speed feature may indicate the speed with which the mobile device is traveling. The GPS accuracy feature may indicate an accuracy (or percent error) of the latitude and longitude features. The latitude and longitude may be resolved to a venue (e.g., a particular business, park, etc.), venue category, (e.g., building, beach, road, tourist attraction, coffee shop, restaurant, etc.), and/or political entity (e.g., country, state, town, etc.). In this manner, the location of the mobile device may be ascertained.

A time feature may indicate a current time, whether the time is in the morning or evening, a day of the week, and/or a specific date. In one embodiment, the time feature may be normalized between 00:00:00-23:59:59 to capture daily application usage patterns.

A charge cable feature may indicate whether a charge cable is plugged into the mobile device. Similarly, an audio cable (e.g., headphone) feature may indicate whether an audio cable is plugged into the mobile device.

Other signal features may include, but are not limited to, a status of a battery of the mobile device (e.g., fully charged, 50% charged), a current status of a screen of the mobile device (e.g., on, off), a current Bluetooth status (e.g., on/off, which network connected to, and/or network type), and/or a current status of a wireless network connection at the mobile device (e.g., connected, disconnected). In some embodiments, the mobile device may detect a brightness and/or volume. In addition, the mobile device may detect sounds or words, which may include a command received from a user.

One or more of the signal features may be used separately or in combination with one another to represent the context of the mobile node (or portion thereof). More particularly, the context of the mobile node may be captured in relation to the use (e.g., opening) of an application installed on the user's mobile device and recorded as historical data pertaining to use of the application. For example, the context may be recorded at the time that the user opens the application.

Distributed Features

One or more distributed features may capture contextual information pertaining to (e.g., surrounding) the use of specific applications. More particularly, a distributed feature may indicate a sequential pattern of actions occurring prior to and/or after an opening an application. For example, action(s) occurring prior to and/or after opening an application may include a change in location, the presence of the mobile node at a particular location, a charge cable action, and/or an audio cable action. In some instances, it may be determined that the use of one application typically occurs prior to or after the use of another application.

Prediction Model

A prediction model may be used to determine, under the current context of the mobile node, the applications that are most likely to be used by a user of a mobile device. Mechanisms for generating a prediction model will be described in further detail below.

In accordance with various embodiments, a prediction model for a mobile device may be generated using historical data pertaining to use of the applications installed on the mobile device. The historical data may indicate a context of the use of an application or the context surrounding (e.g., prior to and/or subsequent to) the use of an application. More particularly, the prediction model may be trained using a first subset of the data and tested using a second subset of the data to ensure that the trained prediction model accurately predicts the application(s) that have a high probability of being used (e.g., launched) by a user of the mobile device under a given context. The prediction model may be trained to identify contexts in which specific applications will be used. In addition, the prediction model may be trained to identify patterns in the data before and/or after opening an application. In this manner, the prediction model may predict the application(s) that are likely to be used by a user of the mobile device under a given context.

Training data used to train the prediction model may include historical data associated with a single mobile device, which may have one or more associated users. Where the historical data collected for a particular mobile device is insufficient to accurately train a prediction model, the training data used to train the prediction model may include historical data associated with a set of mobile devices, which may each be associated with a corresponding set of one or more users. In some instances, each mobile device in the set of mobile devices may have applications installed thereon that include the same plurality of applications. In addition, each mobile device in the set of mobile devices may be associated with users that share a set of the same characteristics (e.g., demographic characteristics) with the user of the mobile device.

A prediction model may be generated by a mobile device and/or remotely located server. For example, a remotely located server may generate and store a plurality of prediction models, where each of the prediction models is associated with a corresponding one of a plurality of mobile devices. The data used to generate the prediction model for a mobile device may be stored locally at the mobile device and/or remotely at a storage device or remotely located server.

In some embodiments, the prediction model may determine, under the current context of the mobile node, the types of applications that are most likely to be used by a user of a mobile device. Thus, the prediction model may be applied to recommend new applications of a specific application type, as well as identify installed applications.

Cold Start Situations

Two of the main challenges that are faced when applications are deployed in real-life environments include the Application Cold Start and the User Cold Start. The Application Cold Start may occur when a user installs a new application on his or her mobile device. Where the user has not yet opened the new application to use the application, contextual information pertaining to the installed application will be unavailable. Alternatively, the user may have opened the new application a limited number of times. As a result, a minimum threshold amount of contextual information may be unavailable for use in training a prediction model. The User Cold Start may occur when contextual information pertaining to all applications installed on the mobile device is unavailable. This may occur after a user installs a homescreen application and opens the homescreen application for the first time. Example methods of handling these two cold start problems will be described in further detail below.

Application Cold Start

For a newly installed application a, on a particular mobile device, contextual information pertaining to the application may be unavailable or limited for the mobile device. Thus, an adequate amount of user-specific information may be unavailable for the application. As a result, the probability of opening the application on the mobile device cannot be ascertained solely based on the contextual information.

In accordance with various embodiments, the probability of opening the application on the mobile device may be determined based, at least in part, upon information associated with other mobile devices on which the application is installed. In this manner, the probability that a user of the mobile device will use a newly installed application under a given context C may be estimated.

User Cold Start

In some instances, data pertaining to application usage of applications installed on a given mobile device may be unavailable. This may occur, for example, when the user purchases a new mobile device or the user has recently installed a homescreen application. In such instances, a prediction model associated with another set of one or more mobile devices/users may be used and/or adapted. The prediction model may be generated based upon historical data associated with one or more other mobile devices (or corresponding users) that are separate from the mobile device. More particularly, the users of the other mobile devices may share a set of characteristics with the user of the mobile device, such as demographic characteristics. In addition, the other mobile devices may all have applications installed thereon that include the plurality of applications that are installed on the mobile device (or a significant portion of the plurality of applications).

Two different strategies to attack the user cold start problem will be discussed below. These two different strategies are the Most Similar User Strategy and the Pseudo User Strategy.

Most Similar User Strategy

"The most similar user" may be identified based, at least in part, by identifying at least one user of at least a subset of other mobile devices based, at least upon characteristics of users of the other mobile devices (and characteristics of the user of the mobile device). A similarity between the user of the mobile device and users of the identified other mobile devices may be ascertained by using metrics such as, for instance, Jaccard similarity between the user of the mobile device and users of the other mobile devices.

After the most similar user has been found we can use the computer-generated model associated with the most similar user's mobile device to predict the behavior of the user of the mobile device. However, the user that has been found to be the most similar may have an application inventory that is very different from the applications installed on the mobile device of the user. In some extreme cases the application inventory of the mobile device of the user may be totally different from the applications installed on mobile devices of other "known" users. As a result, the most similar user strategy would not have any advantage over a purely random strategy. Of course, it is possible to place a threshold on the minimum acceptable similarity between the user of the mobile device and the "most similar user."

When a user installs a homescreen application such as Aviate on his or her mobile device, it is not true that we do not know anything about the user. For example, it is possible to identify the applications that are installed on the user's mobile device. Thus, it may be desirable to identify the "most similar user" at least in part by identifying other mobile devices that also have applications installed thereon that include the applications that are installed on the user's mobile device (or at least a significant portion of these applications).

In accordance with various embodiments, the "most similar user" may be identified from users of other mobile devices having applications installed thereon that include the applications installed on the mobile device (or a significant portion of the plurality of applications). A computer-generated model associated with the other mobile device of this "most similar user" may then be applied to estimate a probability of use of one of the applications installed on the mobile device by the user of the mobile device. The model may be updated or replaced as historical data pertaining to use of the installed applications is collected via the mobile device.

In some embodiments, the "most similar user(s)" may be identified to ascertain a set of installed applications for the similar user(s). As set forth above, similar users may share personal characteristics such as demographics and/or affinities for various types of applications. The system may then choose to recommend one or more of the installed applications.

Pseudo User Strategy

In order to solve the problem of the strategy presented above, the Pseudo User Strategy may be applied. The Pseudo User Strategy may include obtaining historical data associated with one or more other mobile devices, which may in turn be used to train a computer-generated model for predicting behavior of the user of the mobile device. Such historical data may be referred to as a "pseudo history."

Let us assume there are k users $U=\{u_1, u_2, u_3, \ldots, u_k\}$, and let us further assume that each user u has an application inventory $I_u$. When a new user with application inventory $I_{new}$ installs a homescreen application, we can find a number of similar users whose application inventories cover all of the applications in the inventory of the user of the mobile device. The historical data pertaining to use of the applications by the users U may be applied to generate a model associated with the mobile device. The model may be updated periodically or replaced as historical data pertaining to use of the installed applications is collected via the mobile device.

Network Environment

The disclosed embodiments may be implemented in any of a wide variety of computing contexts and may include a variety of networks. A network may couple devices so that communications may be exchanged, such as between a server and a client device or other types of devices, including between wireless devices coupled via a wireless network, for example A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling devices via an ad hoc arrangement or configuration. A peer-to-peer network may employ some devices capable of operating as both a "client" and a "server."

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Communications transmitted via a network typically include signal packets. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

Signal packets may be communicated between devices of a network, such as, for example, to one or more sites employing a local network address. A signal packet may, for example, be communicated over the Internet from a user site via an access device coupled to the Internet. Likewise, a signal packet may be forwarded via network devices to a target site coupled to the network via a network access device, for example. A signal packet communicated via the Internet may, for example, be routed via a path of gateways, servers, etc. that may route the signal packet in accordance with a target address and availability of a network path to the target address.

Figure 3:
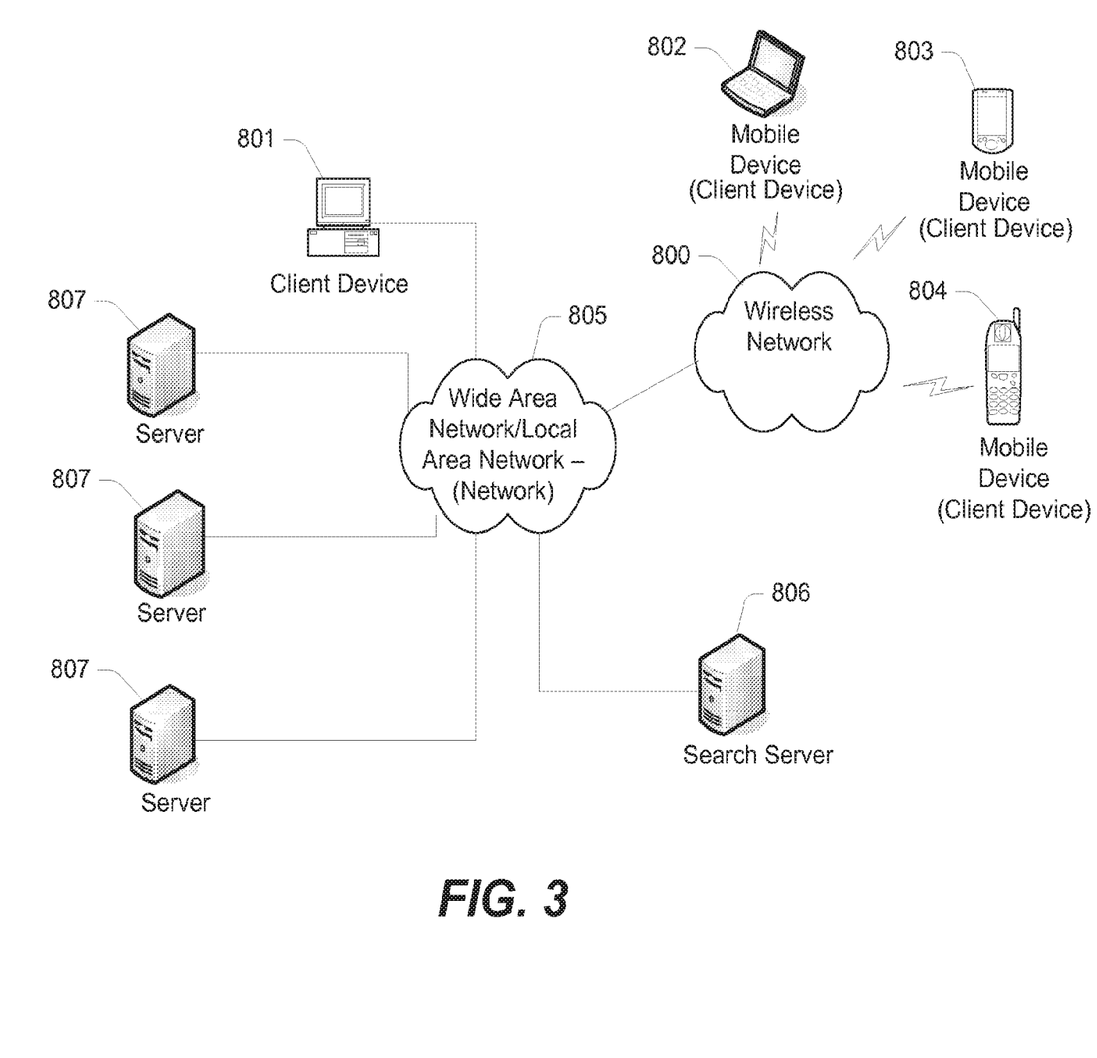
FIG. 3 is a schematic diagram illustrating an example network in which various embodiments may be implemented.

FIG. 3 is a schematic diagram illustrating an example embodiment of a network. Other embodiments that may vary, for example, in terms of arrangement or in terms of type of components, are also intended to be included within claimed subject matter. Implementations are contemplated in which users interact with a diverse network environment. As shown, FIG. 3, for example, includes a variety of networks, such as a LAN/WAN 805 and wireless network 800, a variety of devices, such as client devices 801-804, and a variety of servers such as content server(s) 807 and search server 806. The servers may also include an ad server (not shown). As shown in this example, the client devices 801-804 may include one or more mobile devices 802, 803, 804. Client device(s) 801-804 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The disclosed embodiments may be implemented in some centralized manner. This is represented in FIG. 3 by server(s) 807, which may correspond to multiple distributed devices and data store(s). The server(s) 807 and/or corresponding data store(s) may store user account data, user information, and/or content.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wilds, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Client Device

Figure 4:
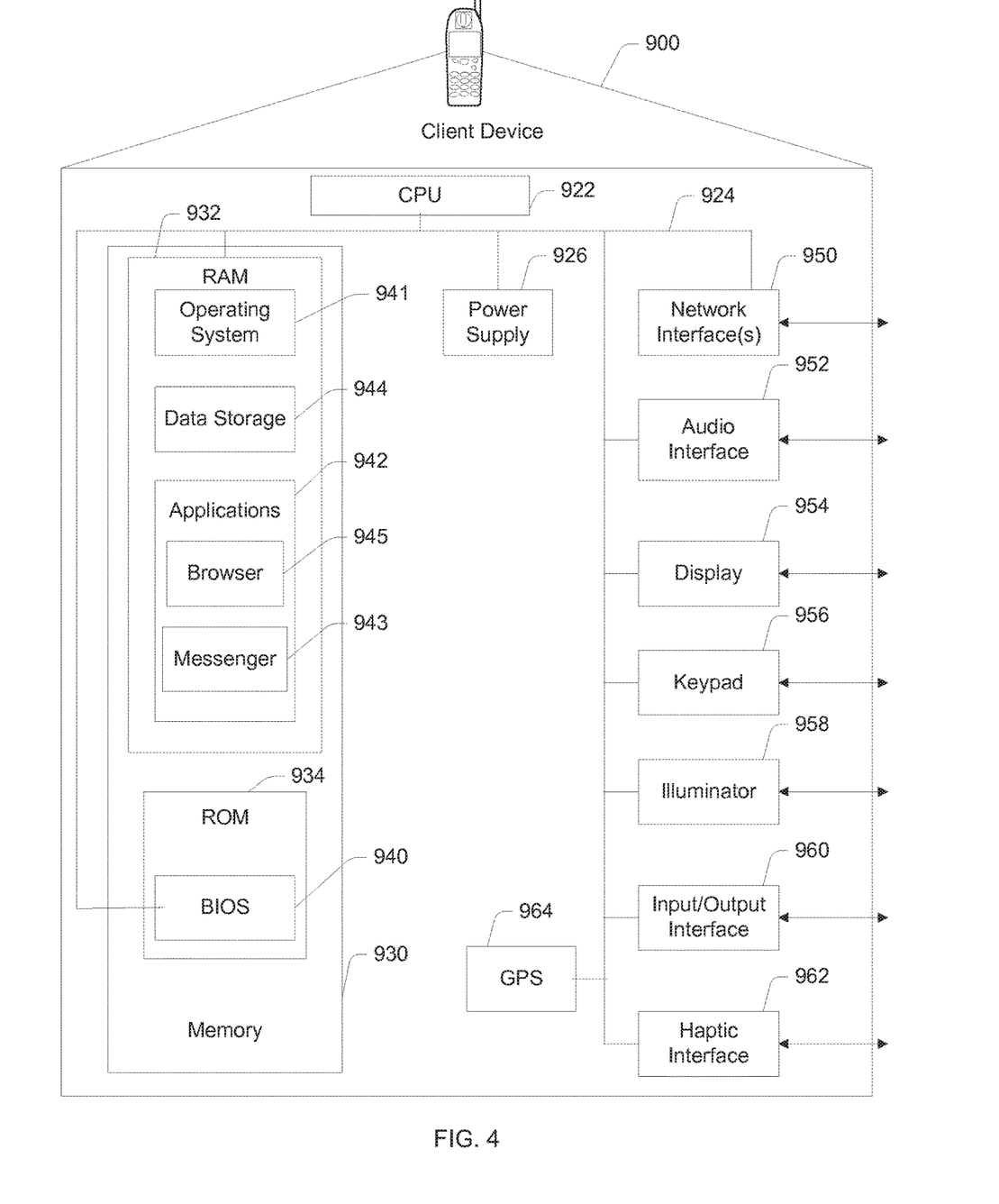
FIG. 4 is a schematic diagram illustrating an example client device in which various embodiments may be implemented.

FIG. 4 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 900 may include one or more central processing units (CPUs) 922, which may be coupled via connection 924 to a power supply 926 and a memory 930. The memory 930 may include random access memory (RAM) 932 and read only memory (ROM) 934. The ROM 934 may include a basic input/output system (BIOS) 940.

The RAM 932 may include an operating system 941. More particularly, a client device may include or may execute a variety of operating systems, including a personal computer operating system, such as a Windows, iOS or Linux, or a mobile operating system, such as iOS, Android, or Windows Mobile, or the like. The client device 900 may also include or may execute a variety of possible applications 942 (shown in RAM 932), such as a client software application such as messenger 943, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 944. A client device may also include or execute an application such as a browser 945 to perform a variety of possible tasks, such as browsing, searching, playing various forms of content, including locally stored or streamed video, or games (such as fantasy sports leagues).

The client device 900 may send or receive signals via one or more interface(s). As shown in this example, the client device 900 may include one or more network interfaces 950. The client device 900 may include an audio interface 952. In addition, the client device 900 may include a display 954 and an illuminator 958. The client device 900 may further include an Input/Output interface 960, as well as a Haptic Interface 962 supporting tactile feedback technology.

The client device 900 may vary in terms of capabilities or features. Claimed subject matter is intended to cover a wide range of potential variations. For example, a cell phone may include a keypad such 956 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 964 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

In some embodiments, an identity of the user (e.g., owner) of the client device may be statically configured. Thus, the device may be keyed to an owner or multiple owners. In other embodiments, the device may automatically determine the identity of the user of the device. For instance, a user of the device may be identified by deoxyribonucleic acid (DNA), retina scan, and/or finger print. From the identity of the user, a user profile and/or client profile may be identified or obtained.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or client device. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
identifying applications installed on a mobile device;
maintaining historical data pertaining to use of the applications installed on the mobile device;
ascertaining a context of the mobile device, wherein the context comprises content of one or more message bodies of one or more electronic mail messages that have been received via the mobile device;
determining a plurality of icons representing a plurality of items to be presented within a homescreen of a display of the mobile device based, at least in part, on (i) the context of the mobile device comprising the content of the one or more message bodies of the one or more electronic mail messages that have been received via the mobile device and (ii) the historical data, the plurality of items comprising at least a portion of the applications installed on the mobile device, wherein the plurality of icons includes a first icon and a second icon, wherein the first icon represents an event indicated in the content of the one or more message bodies of the one or more electronic mail messages that have been received via the mobile device;
updating the homescreen of the mobile device according to the plurality of icons determined based, at least in part, on (i) the context of the mobile device comprising the content of the one or more message bodies of the one or more electronic mail messages that have been received via the mobile device and (ii) the historical data, wherein updating the homescreen of the mobile device comprises modifying, by a processor of the mobile device, the first icon from being displayed within the homescreen with a first appearance to being displayed within the homescreen with a second appearance as a current time approaches a time of the event indicated in the content of the one or more electronic mail messages and displaying the second icon with an appearance that indicates whether a location of the second icon within the homescreen was previously selected by a user of the mobile device;
receiving, from a first application of the applications installed on the mobile device, a request pertaining to display of an icon associated with the first application or a tile associated with the first application;
determining whether to display the icon or the tile according to the request received from the first application based, at least in part, on the context of the mobile device; and
providing the icon or the tile associated with the first application for display within the homescreen of the mobile device responsive to determining to display the icon or the tile associated with the first application.

2. The method as recited in claim 1, comprising:
presenting a third icon based upon a determination that a second electronic mail message, of the one or more electronic mail messages that have been received via the mobile device, is indicative of a purchase.

3. The method as recited in claim 1, comprising:
presenting a third icon based upon a determination that content of a second electronic mail message, of the one or more electronic mail messages that have been received via the mobile device, is indicative of a second event, wherein updating the homescreen of the mobile device comprises modifying, by the processor of the mobile device, the third icon from being displayed within the homescreen with a third appearance to being displayed within the homescreen with a fourth appearance based upon a change to a status of the second event indicated in the content of the second electronic mail message, wherein the second event is associated with a flight.

4. The method as recited in claim 3, wherein the status corresponds to a flight status of the flight.

5. The method as recited in claim 1, wherein the modifying comprises modifying a color of the first icon from a first color to a second color as the current time approaches the time of the event.

6. The method as recited in claim 1, comprising:
presenting a third icon associated with a geographical location; and
modifying an appearance of the third second icon based upon a distance of the mobile device from the geographical location.

7. The method as recited in claim 6, wherein the modifying the appearance of the third icon comprises:
modifying, by the processor, the appearance of the third icon based upon a change to the distance of the mobile device from the geographical location.

8. The method as recited in claim 1, comprising:
presenting a third icon based upon a second event indicated in second content of a second electronic mail message; and
modifying, by the processor, an appearance of the third icon based upon a change to a status of the second event indicated in the second content of the second electronic mail message.

9. The method as recited in claim 1, comprising:
presenting a third icon based upon a determination that content of a second electronic mail message, of the one or more electronic mail messages that have been received via the mobile device, is indicative of a second event, wherein updating the homescreen of the mobile device comprises:
determining, based upon information received via a network connection after the presenting the third icon, a change to a status of the second event indicated in the content of the second electronic mail message; and
modifying, by the processor of the mobile device, the third icon from being displayed within the homescreen with a third appearance to being displayed within the homescreen with a fourth appearance based upon the change to the status of the second event determined based upon the information received via the network connection.

10. An apparatus, comprising:
a processor; and
a memory, at least one of the processor or the memory being configured to:
identify applications installed on a device;
maintain historical data pertaining to use of the applications installed on the device;
ascertain a context of the device, wherein the context comprises content of one or more electronic mail messages that have been received via the device;
determine a plurality of icons representing a plurality of items are to be presented within a homescreen of a display of the device based, at least in part, on (i) the context of the device comprising the content of the one or more electronic mail messages that have been received via the device and (ii) the historical data, the plurality of items comprising at least a portion of the applications installed on the device, wherein the plurality of icons includes a first icon and a second icon, wherein the first icon represents an event indicated in the content of the one or more electronic mail messages that have been received via the device;
update the homescreen of the device according to the plurality of icons determined based, at least in part, on (i) the context of the device comprising the content of the one or more electronic mail messages that have been received via the device and (ii) the historical data, wherein updating the homescreen of the device comprises modifying the first icon from being displayed within the homescreen with a first appearance to being displayed within the homescreen with a second appearance as a current time approaches a time of the event indicated in the content of the one or more electronic mail messages and displaying the second icon with an appearance that indicates whether a location of the second icon within the homescreen was previously selected by a user of the device;
receive, from a first application of the applications installed on the device, a request pertaining to display of an icon associated with the first application or a tile associated with the first application;
determine whether to display the icon or the tile according to the request received from the first application based, at least in part, on the context of the device; and
provide the icon or the tile for display within the homescreen of the device responsive to determining to display the icon or the tile associated with the first application.

11. The apparatus as recited in claim 10, the at least one of the processor or the memory being configured to:
modify a display attribute of at least one icon of the plurality of icons based, at least in part, on a frequency of access of a corresponding item.

12. The apparatus as recited in claim 10, the at least one of the processor or the memory being configured to:
present a third icon; and
modify an appearance of the third icon based upon a change to a distance of the device from a geographical location.

13. The apparatus as recited in claim 10, the at least one of the processor or the memory being configured to:
modify a display attribute of at least one icon of the plurality of icons based, at least in part, on recency of access of a corresponding item.

14. A computer program product, comprising one or more non-transitory computer readable media having computer program instructions stored therein, the computer program instructions being configured such that, when executed by one or more processors, the computer program instructions cause the one or more processors to:
identify applications installed on a device;
maintain historical data pertaining to use of the applications installed on the device;
ascertain a context of the device, wherein the context comprises content of one or more electronic messages that have been received via the device;
determine locations in which a plurality of icons representing a plurality of items are to be presented within a homescreen of a display of the device based, at least in part, on at least one of (i) the context of the device comprising the content of the one or more electronic messages that have been received via the device or (ii) the historical data, the plurality of items comprising at least a portion of the applications installed on the device, wherein the plurality of icons includes a first icon and a second icon, wherein the first icon represents an event indicated in the content of the one or more electronic messages that have been received via the device;
update the homescreen of the device according to the locations determined based, at least in part, on at least one of (i) the context of the device comprising the content of the one or more electronic messages that have been received via the device or (ii) the historical data, wherein updating the homescreen of the device comprises modifying the first icon from being displayed within the homescreen with a first appearance to being displayed within the homescreen with a second appearance as a current time approaches a time of the event indicated in the content of the one or more electronic messages and displaying the second icon with an appearance that indicates whether a location of the second icon within the homescreen was previously selected by a user of the device;

receive, from a first application, a request pertaining to display of an icon associated with the first application or a tile associated with the first application;

determine whether to display the icon or the tile according to the request received from the first application based, at least in part, on the context of the device; and provide the icon or the tile for display within the homescreen of the device responsive to determining to display the icon or the tile associated with the first application.

15. The computer program product as recited in claim 14, wherein the context comprises a current brightness detected at the device.

16. The computer program product as recited in claim 14, wherein the context comprises a current headphone status, the current headphone status indicating whether the user has plugged headphones into the device.

17. The computer program product as recited in claim 14, wherein the determining locations is performed based, at least in part, on a device profile that indicates a second context present during a particular user-selected arrangement of the plurality of icons.

18. The computer program product as recited in claim 14, wherein the context comprises sounds detected at the device.

19. The computer program product as recited in claim 14, wherein the content of the one or more electronic messages that have been received via the device comprises a second electronic message indicative of a purchase.

20. The computer program product as recited in claim 14, wherein the context comprises words detected at the device.

\* \* \* \* \*